United States Patent [19]

Brock et al.

[11] 4,183,496

[45] Jan. 15, 1980

[54] LOW RATIO ENGINE MOUNTING

[75] Inventors: Waine T. Brock, Mt. Clemens; Wayne E. Katzer, Lake Orion, both of Mich.

[73] Assignee: Chrysler Corporation, Highland Park, Mich.

[21] Appl. No.: 938,132

[22] Filed: Aug. 30, 1978

[51] Int. Cl.² .............................................. F16F 15/00
[52] U.S. Cl. ................................... 248/638; 267/141.4
[58] Field of Search ............... 248/638, 632, 634, 635, 248/659, 576, 609, 606; 267/141, 141.3, 141.4, 141.5; 188/1 B

[56] References Cited

U.S. PATENT DOCUMENTS

| 1,975,810 | 10/1934 | Trott | 248/659 X |
| 3,565,373 | 2/1971 | Frye | 267/140.3 |
| 3,702,178 | 11/1972 | Schulz | 267/140.3 |
| 3,770,231 | 11/1973 | Kirchgessner | 248/659 |

FOREIGN PATENT DOCUMENTS

| 128990 | 7/1946 | Australia | 248/632 |
| 142244 | 9/1949 | Australia | 188/1 B |
| 1454671 | 11/1976 | United Kingdom | 188/1 B |

*Primary Examiner*—J. Franklin Foss
*Attorney, Agent, or Firm*—Baldwin & Newtson

[57] ABSTRACT

A low spring rate ratio bushing suitable for use as an engine mount. The mount connects an engine to a vehicle chassis by means of an inner and outer member separated by a flexible member. A plurality of flexible legs connect the inner member and outer member in a manner which lessens the vibration transferred from the engine to the chassis.

6 Claims, 1 Drawing Figure

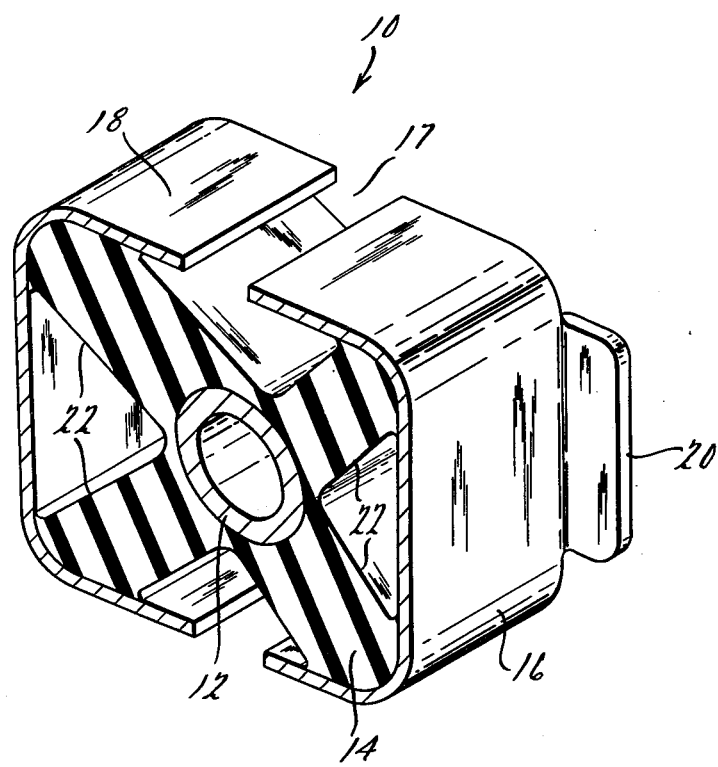

LOW RATIO ENGINE MOUNTING

BACKGROUND OF THE INVENTION

1. Field of the Invention

In one aspect, this invention relates to engine mounting devices. In a further aspect, this invention relates to vibration isolating bushings.

2. Prior art

The advent of four cylinder engines in vehicles has created a new set of problems for automotive engineers. Four cylinder engines inherently have a second order vibration greater than the six and eight cylinder engines presently in use. Such vibrations when transmitted to the automotive chassis on which the engine is mounted are disconcerting to the driver and contribute to general driver fatigue and irritability.

Prior art engine mounts generally comrpise a tubular housing surrounding a shaped rubber bushing featuring two voids. The bushing has a center aperture. The engine mount has the housing generally attached to the vehicle and the engine is mounted to the vehicle by means of a connector through the aperture. The void in the rubber bushing controls some of the vibrations in one direction, but in general allows the passage of vibration. Such engine mounts do not properly isolate the vibration of a four cylinder engine.

As an alternative, certain engines have installed counter balanced rotating shafts as part of the engine. Such systems work, but require the use of precision parts, increase the complexity of the engine, add substantial weight and increase cost.

BRIEF SUMMARY OF THE INVENTION

The motor mount of this invention provides a means for decreasing the amount of engine vibration transmitted between the engine and the automobile chassis. The mount comprises a housing adapted to be attached to one of two items, the engine or the chassis. A tubular member is attached to the other of the items; at least three legs having one end attached to the tube extend radially outward from the tubular member and are attached to the housing.

BRIEF DESCRIPTION OF THE DRAWINGS

In the accompanying drawing, the FIGURE shows one embodiment of an engine mount (in Section) made according to the practice of this invention.

DESCRIPTION OF A PREFERRED EMBODIMENT

The engine mount of the FIGURE comprises three main components, a housing 10, a tubular member 12, and an elastomeric member 14. As shown, the housing 10 includes two separate U-shaped pieces, 16 and 18, which are symmetrical and have a flange 20 formed on one side of the piece projecting at a right angle to the longitudinal axis of the engine mount. The flange 20 can be engaged by an adapting bracket mounted to the engine. The two separate pieces can be formed from suitable structural materials such as low carbon steel, the parts being easily formed by normal stamping techniques. Of course, the housing as shown can be modified depending on the particular configuration of engine and chassis. The housing is shown as split; however, it can be formed as a single piece when so desired.

The gap 17 between the housing 16 and 18 allows the two portions to be moved together after molding of the elastomeric member. This feature allows preloading the elastomeric member thereby increasing longevity, work load strength, and overload tolerance. Adjustment of the gap dimension would provide a viable means of precise spring rate control. In addition, the gap 17 allows the mount to be deformed so as to make assembly easier.

The tubular member 12 can be formed from normal low carbon tube stock. A tube having a 0.090 inch wall thickness flanged to about 0.25-0.35 inch on the ends has been found adequate for mounting four cylinder engines weighing about 450 pounds.

The elastomeric member 14 shown has four legs 22, which project outward from the tubular member 12, each of the legs contacting one corner of the housing 10. Four legs 22 are shown, but the number of legs is a matter of choice and can vary with the shape of the desired housing. Generally, there will be at least three legs, that being the minimum number necessary to provide essentially constant radial spring rates when measured along different directions.

The elastomeric member can be formed from natural or synthetic rubbers having the ability to withstand the environmental conditions normally found in an engine compartment including elevated temperatures, oil, etc. Some example of suitable rubbers are: Natural, SBR, EPDM, EPDM/Butyl Blends, Halo-Butyl Blends, Silicone, PPO, etc.

The rubber chosen will normally have a shore A durometer range of about 40 to 70 with a preferred range of about 42-48 for superior second order vibration dampening.

When formed, the engine mount of this invention will have essentially one spring rate value in all the radial directions. To properly isolate second order vibrations, the ratio between the spring rates in any two directions (kilograms/meter) should be about 0.8-1.2. Thus, there is not more than about 20 percent variation between the spring rates measured along any two radial directions.

As a further consequence of the structure of this invention, a motor mount is formed with a very low deflection force, often described as "soft". Motor mounts made using this structure can operate at about 600-900 pounds force per inch deflection and more preferably 700-800 pounds per inch deflection. These values are considerably softer than the normal engine mounts presently used which operate at about 1500 to 4000 pounds/inch deflection. The increased softness provides the excellent vibration isolation desired primarily for the second excitation.

Various modifications and alterations to this invention will become apparent to those skilled in the art without departing from the scope and spirit of this invention. It is understood that this invention is not limited to the illustrative embodiment set forth above.

What is claimed is:

1. An engine mount adapted to be interposed between a first chassis portion and a second engine portion for driving said chassis, said mount comprising:
    an outer housing having means for attachment of one of the portions to be joined, said outer housing being formed from two separate and distinct pieces haveing a gap therebetween;
    an inner cylindrical member adapted to engage the second portion to be joined and
    an elastomeric member which has a portion encircling the inner cylindrical member and at least three arms having one end attached to the encircling portion and the other end in contact with the housing, whereby the vibration damping quanties are essentially radially constant.

2. The engine mount of claim 1 wherein the ratio between the spring rates measured in any two radial directions is about 0.8–1.2.

3. An engine mount adapted to be interposed between a vehicle chassis and an engine adapted to drive said chassis, said mount comprising:
- an inner cylindrical member adapted to engage a portion of the vehicle chassis and be fastened thereto;
- an elastomeric member which has a portion encircling the inner cylindrical member and a plurality of arms extending radially outward from said cylindrical member, one end of each of said arms being attached to said encircling portion; and
- a housing including at least two members adapted to be attached to said engine, said housing surrounding the inner cylindrical member and elastomeric member, said housing being attached to the ends of said arms opposite said inner cylindrical member, the members of said housing having a gap therebetween in the longitudinal direction allowing compression of the outer housing.

4. The engine mount of claim 3 wherein said elastomeric material has a Shore A durometer of about 40 to 80.

5. The engine mount of claim 3 wherein said housing has a generally rectangular shape and said elastomeric member has four arms each said arms engaging a distinct corner of said housing.

6. The engine mount of claim 3 wherein the ratio between the spring rates measured in any two radial directions is about 0.8 to 1.2.

* * * * *